US012798454B2

(12) United States Patent
Matsui

(10) Patent No.: US 12,798,454 B2
(45) Date of Patent: Nov. 17, 2026

(54) VEHICLE SEAT

(71) Applicant: TOYOTA BOSHOKU KABUSHIKI KAISHA, Aichi (JP)

(72) Inventor: Hayato Matsui, Chiryu (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 100 days.

(21) Appl. No.: 19/052,782

(22) Filed: Feb. 13, 2025

(65) Prior Publication Data

US 2025/0262996 A1 Aug. 21, 2025

(30) Foreign Application Priority Data

Feb. 21, 2024 (JP) ................................ 2024-024568

(51) Int. Cl.
*B60N 2/22* (2006.01)
*B60N 2/42* (2006.01)
*B60N 2/427* (2006.01)

(52) U.S. Cl.
CPC ........... *B60N 2/42709* (2013.01); *B60N 2/22* (2013.01); *B60N 2/42* (2013.01); *B60N 2/427* (2013.01)

(58) Field of Classification Search
CPC . B60N 2/22; B60N 2/42; B60N 2/427; B60N 2/42709
See application file for complete search history.

(56) References Cited

U.S. PATENT DOCUMENTS

| | | | | |
|---|---|---|---|---|
| 6,209,955 | B1 * | 4/2001 | Seibold | B60N 2/4221 297/367 R |
| 7,070,236 | B2 * | 7/2006 | Kawashima | B60N 2/42709 297/216.13 |
| 7,537,283 | B2 * | 5/2009 | Niitsuma | B60N 2/42709 297/216.13 |
| 8,955,906 | B2 * | 2/2015 | Evans | B60N 2/42709 297/216.13 |
| 10,259,358 | B2 * | 4/2019 | Mizobata | B60N 2/4228 |
| 10,752,138 | B2 * | 8/2020 | Baba | B60N 2/0031 |
| 11,999,276 | B2 * | 6/2024 | Murase | B60N 2/015 |
| 12,319,181 | B2 * | 6/2025 | Kondo | B60N 2/0732 |
| 12,559,005 | B2 * | 2/2026 | Nagatani | B60N 2/42 |
| 2014/0103626 | A1 * | 4/2014 | Seki | B60N 2/4228 280/730.2 |
| 2015/0091346 | A1 * | 4/2015 | Kitou | B60N 2/42709 297/216.14 |

FOREIGN PATENT DOCUMENTS

| | | | |
|---|---|---|---|
| JP | 10278644 A * | 10/1998 | B60N 2/42709 |
| JP | 2023-75726 | 5/2023 | |
| KR | 101513256 B1 * | 4/2015 | B60N 2/42745 |

* cited by examiner

*Primary Examiner* — Rodney B White
(74) *Attorney, Agent, or Firm* — GREENBLUM & BERNSTEIN, P.L.C.

(57) ABSTRACT

A vehicle seat includes a back frame, a cushion frame, a recliner, and a recliner plate containing an impact absorbing hole. The recliner plate includes a first portion fixed to the recliner, a second portion fixed to the cushion frame, and a third portion located between the first portion and the second portion and located rearward of the impact absorbing hole. The third portion includes a stepped portion connecting to the second portion, and the third portion includes a portion located on an inside with respect to the second portion.

6 Claims, 11 Drawing Sheets

VEHICLE SEAT

CROSS-REFERENCE TO RELATED APPLICATIONS

This application claims the benefit of Japanese Patent Application No. 2024-024568 filed on Feb. 21, 2024 with the Japan Patent Office, and the entire disclosure of Japanese Patent Application No. 2024-024568 is incorporated herein by reference.

BACKGROUND

The present disclosure relates to a vehicle seat to be mounted in a vehicle.

For example, a recliner plate of a vehicle seat disclosed in Japanese Unexamined Patent Application Publication No. 2023-75726 contains an impact absorbing hole for reducing a load to act on a recliner in the event of a collision.

SUMMARY

The impact absorbing hole is configured for, when a large load including a downward component acts on the recliner plate, proactively causing plastic deformation of a specific portion provided in the recliner plate to thereby cause the specific portion to absorb a load energy. The present disclosure discloses an example of a vehicle seat with this point taken into consideration.

It is desirable that a vehicle seat to be mounted in a vehicle comprise at least one of the elements described below, for example.

Specifically, such elements are: a back frame forming a framework of a seatback; a cushion frame forming a framework of a seat cushion; a recliner configured to change an angle of the back frame relative to the cushion frame, the recliner being fixed, at one side thereof in a seat-width direction, to the back frame; and a recliner plate to which the recliner is fixed at an other side thereof in the seat-width direction, the recliner plate being fixed to a rear end portion of the cushion frame, the recliner plate containing an impact absorbing hole arranged below a rotation center shaft of the recliner.

The recliner and the back frame are arranged on an inside with respect to the recliner plate in the seat-width direction. The inside refers to a side, in the seat-width direction, on which the recliner is located with respect to the recliner plate.

The recliner plate includes a first portion fixed to the recliner, a second portion fixed to the cushion frame, and a third portion located between the first portion and the second portion and located rearward of the impact absorbing hole, and the third portion includes a portion located on the inside with respect to the second portion.

Moreover, it is desirable that a dimension of a stepped portion, which is a portion of the third portion connecting to the second portion, in a seat front-rear direction be smaller than a dimension of a remaining portion of the third portion in the seat front-rear direction, to thereby render a sectional area of the stepped portion smaller than a sectional area of the remaining portion of the third portion, and it is desirable that a flexural rigidity of the third portion excluding the stepped portion and a range from the third portion excluding the stepped portion over to the first portion in the recliner plate be greater than a flexural rigidity of the stepped portion.

Accordingly, in the vehicle seat, when a large load including a downward component acts on the recliner plate, stress is likely to concentrate on the stepped portion, and this causes the stepped portion to be plastically deformed preferentially. Therefore, combined with an effect of the impact absorbing hole, the load to act on the recliner in the event of a collision can be reliably reduced.

The vehicle seat may be configured as below, for example.

Specifically, it is desirable that a recess recessed from a seat front side toward a seat rear side be arranged in a portion of the third portion connecting to the second portion, and that the recess render the dimension of the stepped portion in the seat front-rear direction smaller than the dimension of the remaining portion of the third portion in the seat front-rear direction. This makes it possible to inhibit the back frame from falling rearward significantly when a load is applied.

Specifically, if the recess is recessed from the seat rear side toward the seat front side, when a load acting on the back frame deforms the stepped portion such that a space in the recess is reduced, the back frame falls rearward significantly.

In contrast, the recess of the vehicle seat is recessed from the seat front side toward the seat rear side; thus, even when a load acting on the back frame deforms the stepped portion such that the space in the recess is reduced, deformation to cause the back frame to fall rearward significantly can be inhibited.

It is desirable that the recess be formed such that a top of the recess is located on an imaginary line obtained by connecting inflection points of the stepped portion. Moreover, it is desirable that the cushion frame be arranged on the inside with respect to the recliner plate in the seat-width direction.

BRIEF DESCRIPTION OF THE DRAWINGS

An example embodiment of the present disclosure will be described below with reference to the accompanying drawings, in which.

DETAILED DESCRIPTION OF EXEMPLARY EMBODIMENTS

Figure 1:
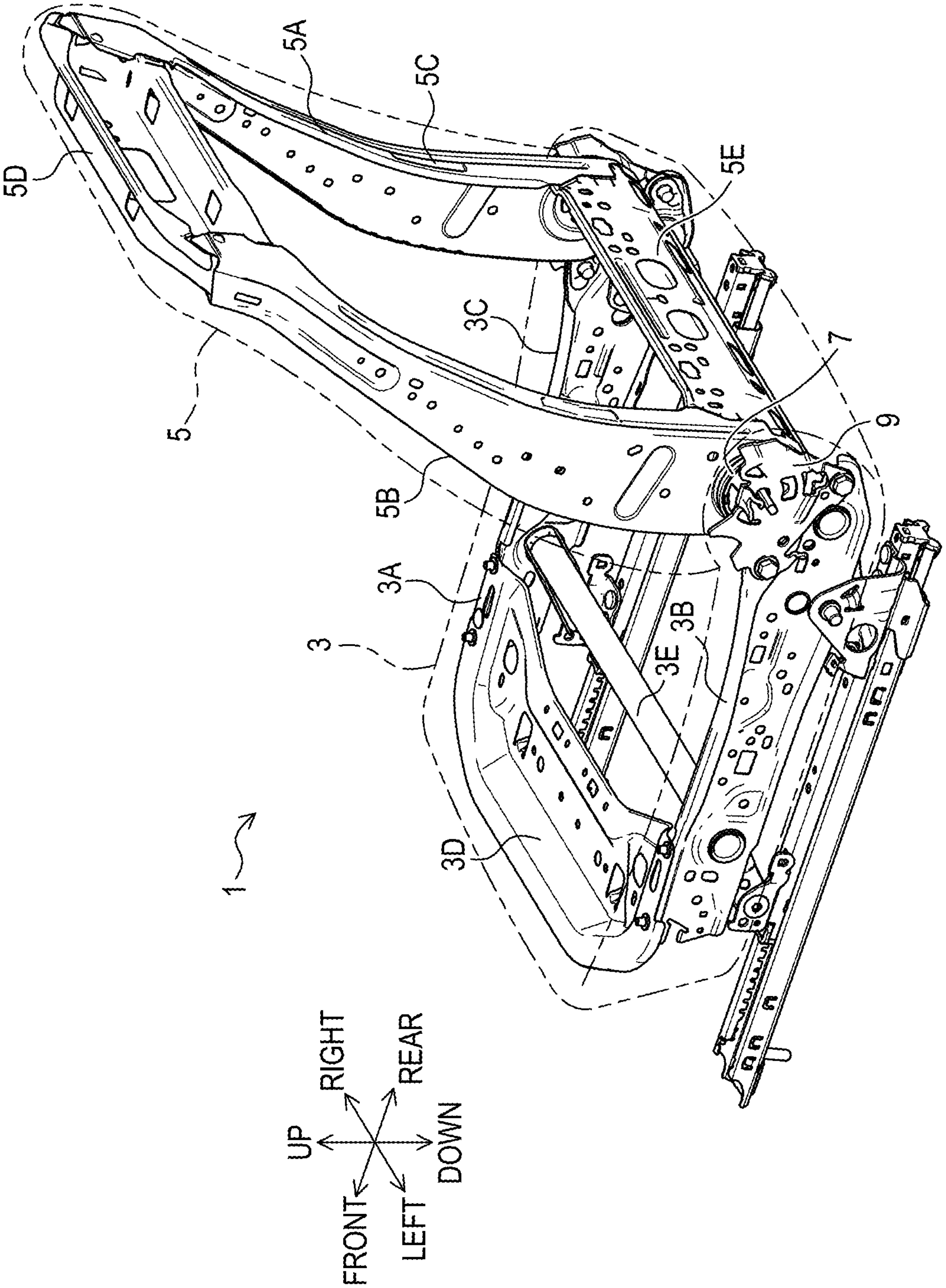
FIG. 1 is a diagram showing a vehicle seat of a first embodiment.

Below-described embodiments of the invention show examples of the embodiments that fall within the technical scope of the present disclosure. That is, invention-specifying matters and so on recited in the appended claims are not limited by specific configurations, structures, and so on indicated in the embodiments below.

The embodiments below are examples in which a vehicle seat according to the present disclosure is applied to a seat to be mounted in a vehicle, such as an automobile. Arrows indicating directions, hatched lines, and so on shown in the drawings are provided to facilitate understanding of mutual relationships between the drawings, shapes of members or portions, and so on.

Accordingly, the vehicle seat is not limited by the directions shown in the drawings. The directions shown in the drawings are those in a state where the vehicle seat according to the embodiments below is mounted in the automobile. The drawings provided with hatched lines do not always represent sectional views.

A member or a portion described at least with a reference numeral is at least one in number except in a case of being accompanied by a restrictive wording such as "only one". In other words, the member or the portion may be two or more in number in a case of not being accompanied by the restrictive wording such as "only one". The vehicle seat indicated in the present disclosure comprises at least one of (i) an element such as the member or the portion described at least with a reference numeral or (ii) a structural portion shown in the drawings.

First Embodiment

1. Overview of Vehicle Seat

As shown in FIG. 1, a vehicle seat 1 comprises at least a seat cushion 3, a seatback 5, a recliner 7, and a recliner plate 9. The seat cushion 3 supports buttocks of an occupant. The seatback 5 supports a back of the occupant.

The seat cushion 3 comprises a cushion frame 3A and so on. The seatback 5 comprises a back frame 5A and so on. The cushion frame 3A forms a framework of the seat cushion 3. The back frame 5A forms a framework of the seatback 5.

The cushion frame 3A comprises two side frames (hereinafter referred to as lower arms) 3B and 3C, a front panel 3D, a coupling pipe 3E, and so on. The lower arm 3B is a high-strength member that is arranged on one end side in a seat-width direction and that extends in a seat front-rear direction.

The lower arm 3C is a high-strength member that is arranged on the other end side in the seat-width direction and that extends in the seat front-rear direction. The front panel 3D is a high-strength member that is arranged on a front end side in the seat front-rear direction and that couples the two lower arms 3B and 3C to each other. The coupling pipe 3E is a high-strength member that is arranged rearward of the front panel 3D and that couples the two lower arms 3B and 3C to each other.

The back frame 5A comprises two side frames 5B and 5C, an upper coupling panel 5D, a lower coupling panel 5E, and so on. The side frame 5B is a high-strength member that is arranged on one end side in the seat-width direction and that extends in a substantially up-down direction.

The side frame 5C is a high-strength member that is arranged on the other end side in the seat-width direction and that extends in the substantially up-down direction. The upper coupling panel 5D is a high-strength member that couples upper end portions of the side frames 5B and 5C to each other. The lower coupling panel 5E is a high-strength member that couples lower end portions of the side frames 5B and 5C to each other.

The recliner 7 is a mechanism for changing and adjusting an angle of the back frame 5A relative to the cushion frame 3A. The recliner plate 9 is fixed to a rear end portion of the cushion frame 3A.

The back frame 5A is coupled to the cushion frame 3A via the recliner 7 and the recliner plate 9. In the present embodiment, the recliner 7 and the recliner plate 9 are arranged on each of one end side and the other end side in the seat-width direction.

The respective recliners 7 and the respective recliner plates 9 are shaped and structured in a substantially symmetrical manner in the seat-width direction. An explanation will be given below mainly of the recliner 7, the recliner plate 9, and relevant elements arranged on one end side in the seat-width direction (on the left end side in FIG. 1).

2. Details of Recliner Plate and so On

Figure 2:
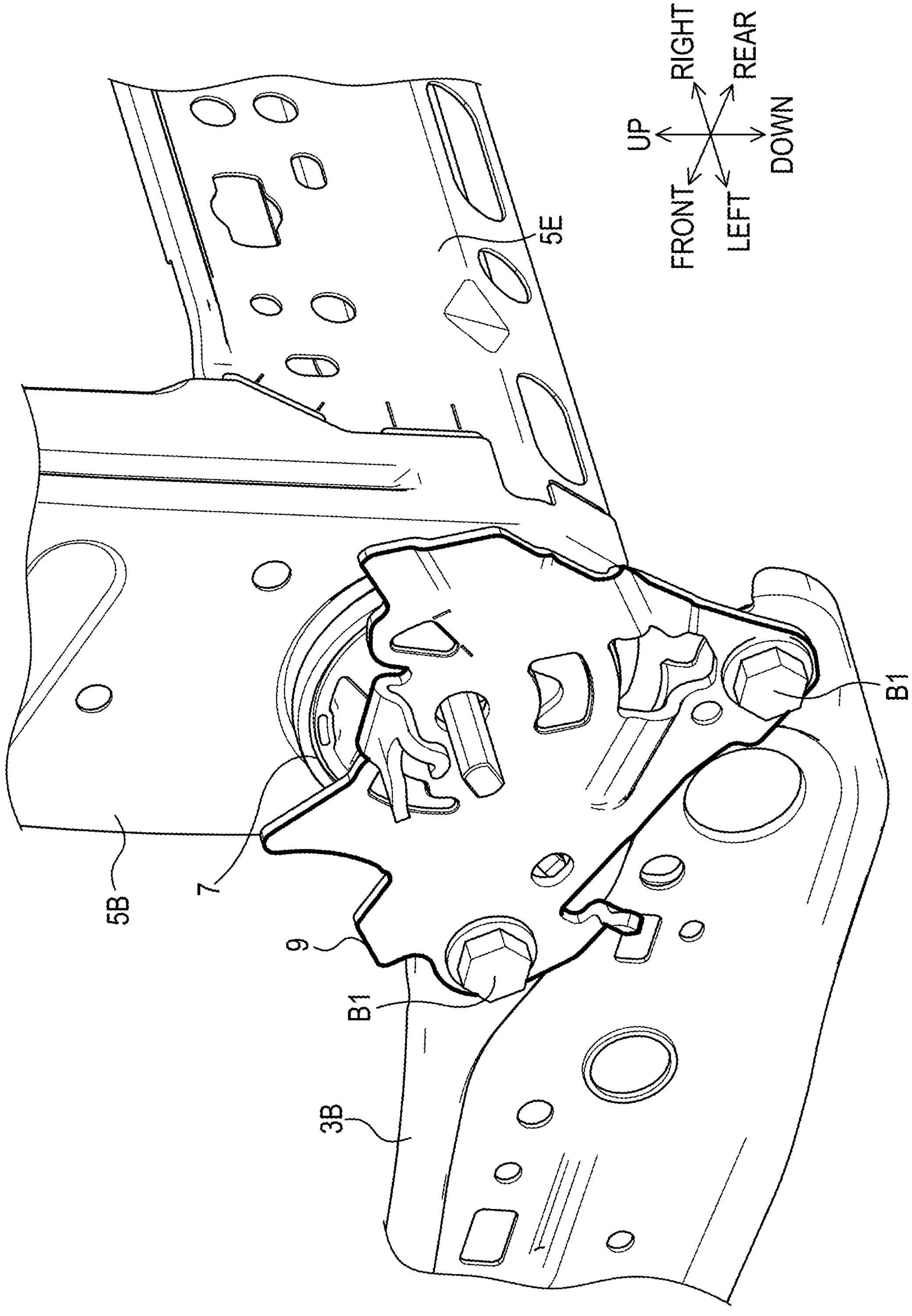
FIG. 2 is a diagram showing a recliner plate and so on of the first embodiment.

As shown in FIG. 2, the recliner 7 is fixed, at one side thereof in the seat-width direction (at the right side in FIG. 2), to the back frame 5A (specifically, to the side frame 5B) and is fixed, at the other side thereof in the seat-width direction (at the left side in FIG. 2), to the recliner plate 9.

Figure 3:
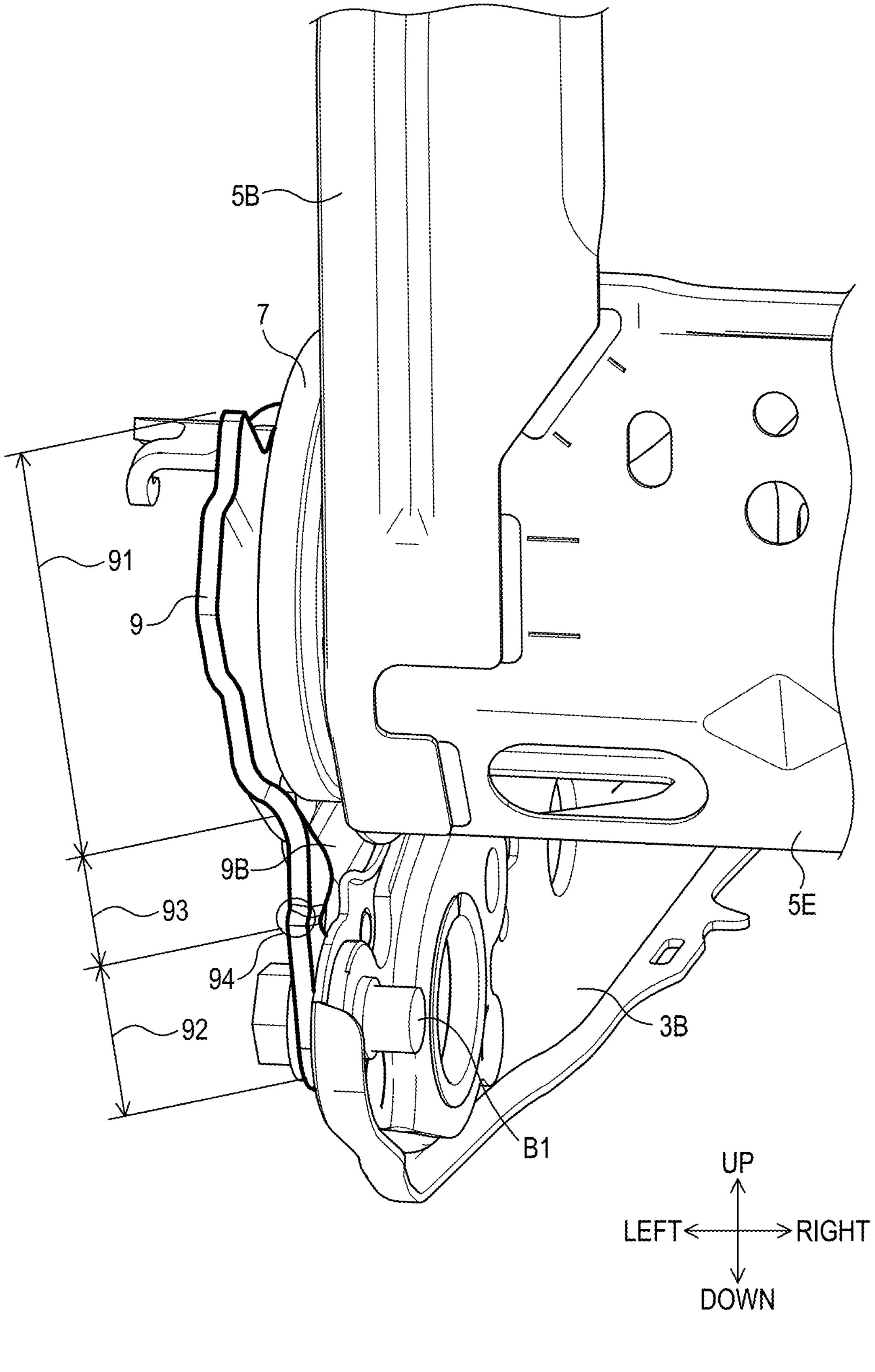
FIG. 3 is a diagram showing the recliner plate and so on of the first embodiment.
Figure 4:
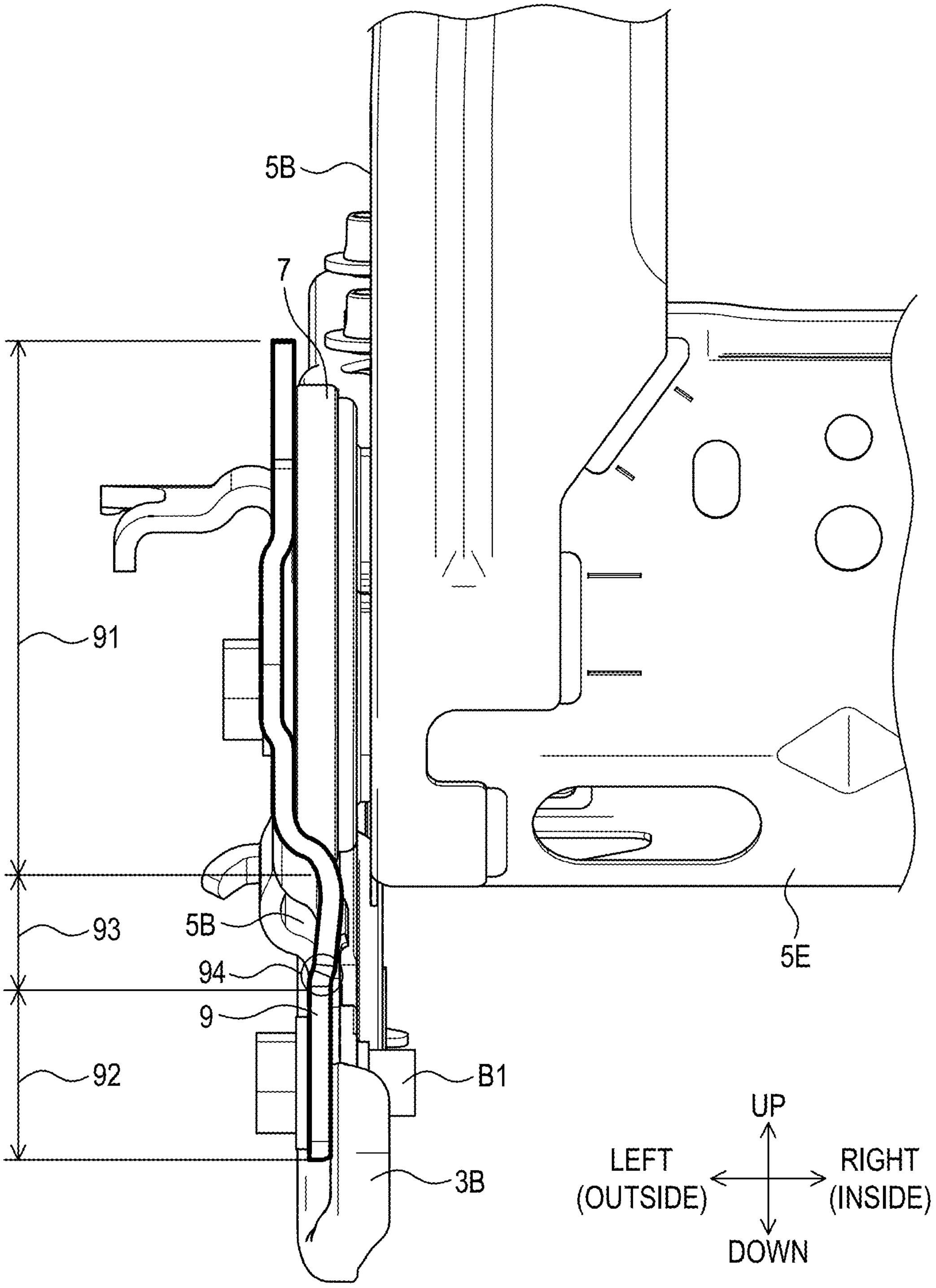
FIG. 4 is a diagram showing the recliner plate and so on of the first embodiment.

As shown in FIGS. 3 and 4, the lower arm 3B, the recliner 7, and the side frame 5B are arranged on an inside (on the right side in FIGS. 3 and 4) with respect to the recliner plate 9 in the seat-width direction. Here, the "inside" refers to a side, in the seat-width direction, on which the recliner 7 is located with respect to the recliner plate 9.

In the present embodiment, the side frame 5B and the recliner plate 9 are joined to the recliner 7 by welding. The recliner plate 9 is fixed to the rear end portion of the cushion frame 3A (specifically, the lower arm 3B) with a fastener, such as a bolt B1.

Figure 5:
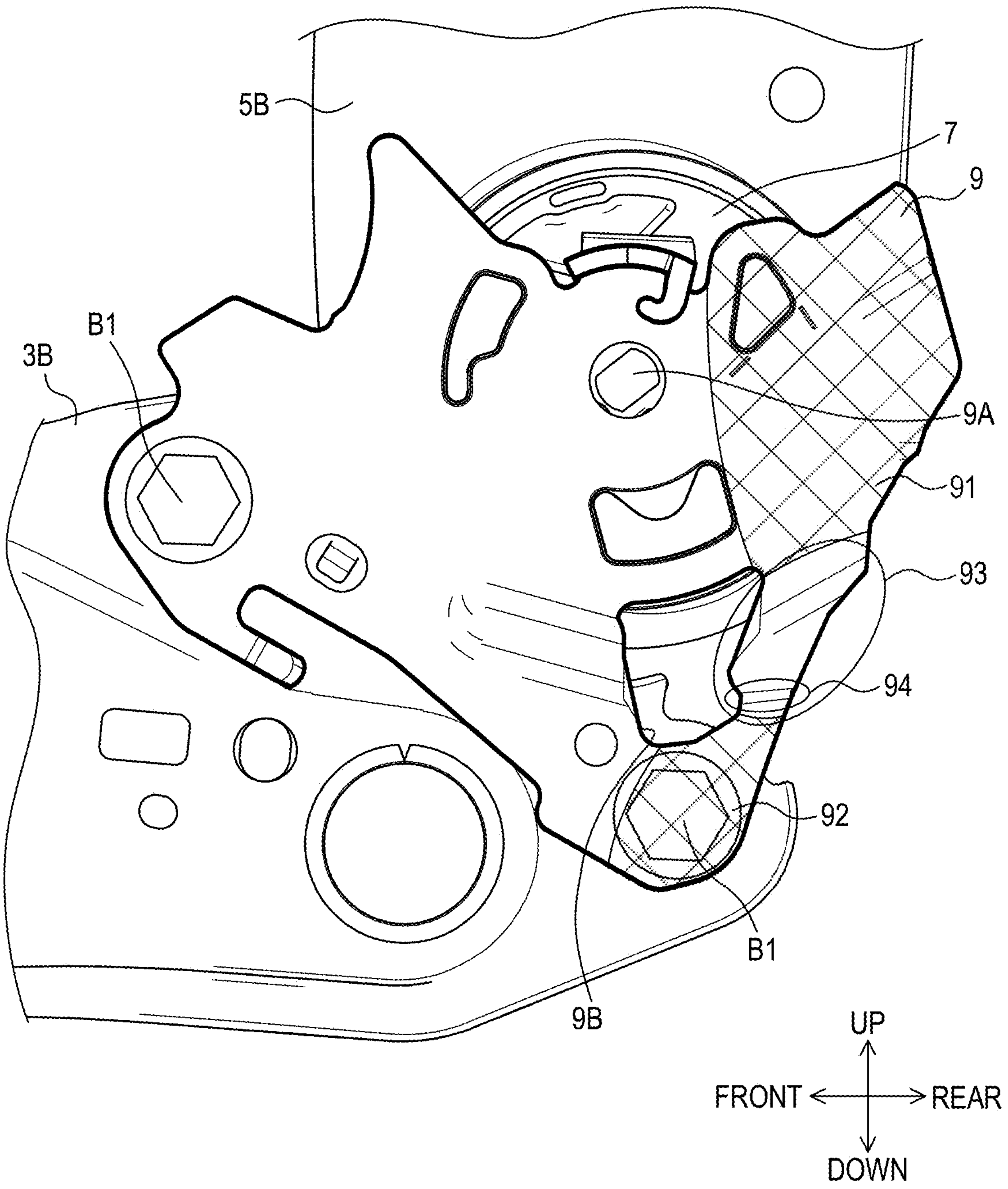
FIG. 5 is a diagram showing the recliner plate and so on of the first embodiment.

As shown in FIG. 5, the recliner plate 9 contains an impact absorbing hole 9B. The impact absorbing hole 9B is arranged below a rotation center shaft 9A of the recliner 7. The impact absorbing hole 9B reduces a load to act on the recliner 7 in the event of a collision.

The recliner plate 9 is provided with at least a first portion 91, a second portion 92, and a third portion 93. The first portion 91 and the second portion 92 are hatched in a coarse grid pattern in FIG. 5.

In the recliner plate 9, the first portion 91 is a portion fixed to the recliner 7, and the second portion 92 is a portion fixed to the cushion frame 3A.

The third portion 93 is located between the first portion 91 and the second portion 92 and located rearward of the impact absorbing hole 9B in the seat front-rear direction. Moreover, as shown in FIG. 4, the third portion 93 includes a portion located on the inside with respect to the second portion 92 (on the right side in FIG. 4).

Figure 6:
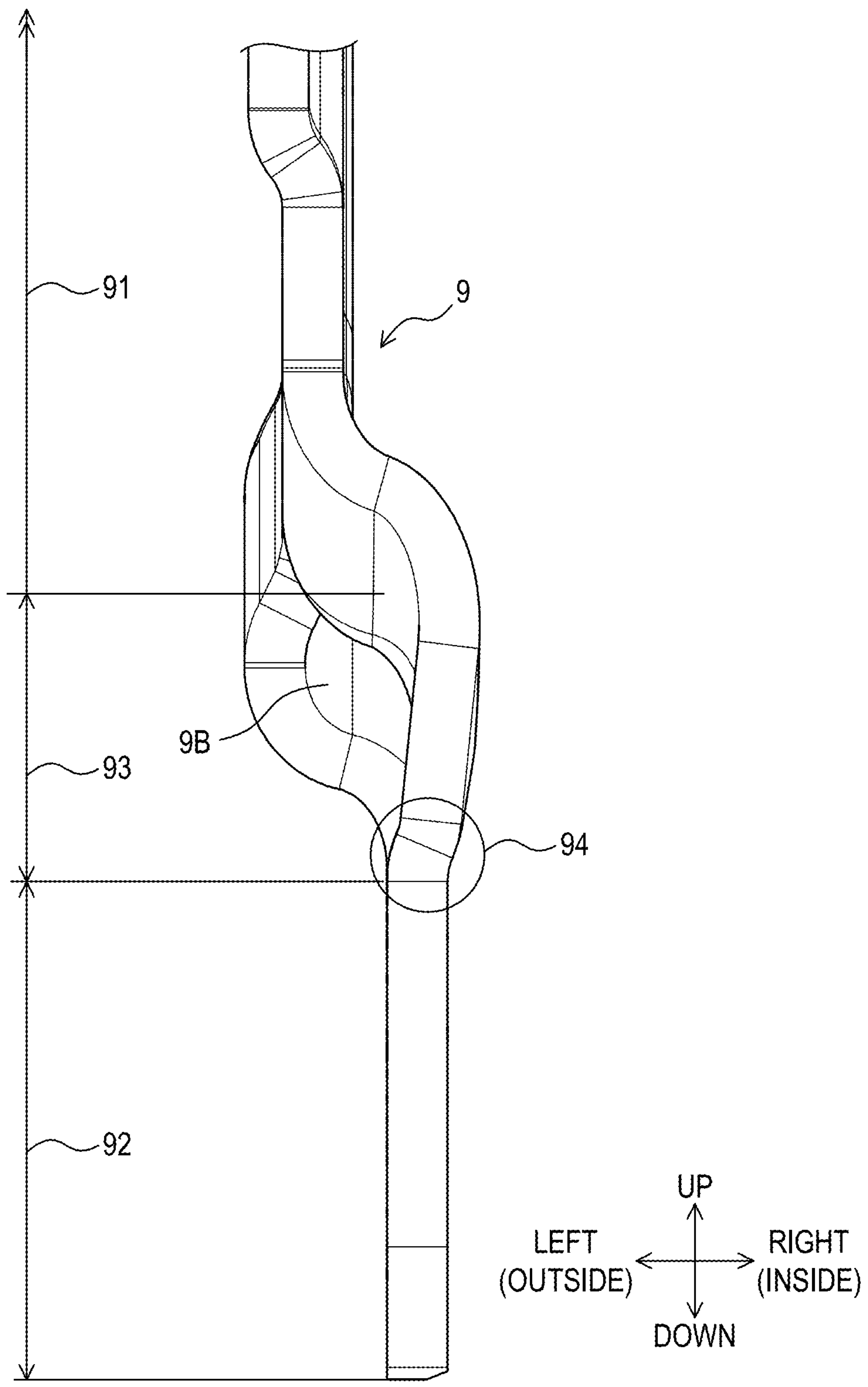
FIG. 6 is a diagram showing the recliner plate of the first embodiment.

Thus, as shown in FIG. 6, a portion of the third portion 93 connecting to the second portion 92 has a step. The portion of the third portion 93 connecting to the second portion 92 and having the step is hereinafter referred to as a stepped portion 94.

Figure 7:
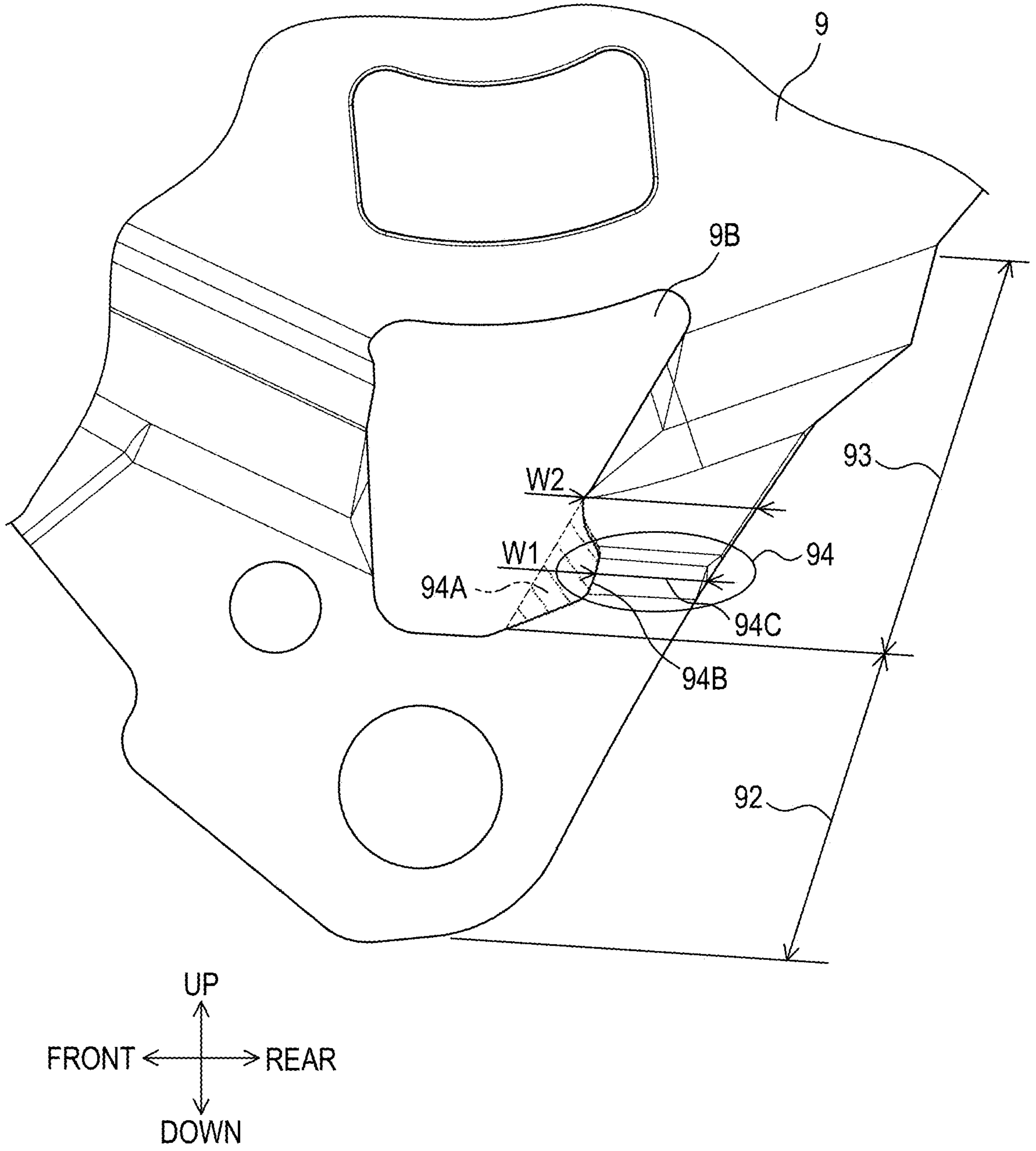
FIG. 7 is a diagram showing the recliner plate of the first embodiment.

As shown in FIG. 7, a dimension W1 of the stepped portion 94 in the seat front-rear direction is smaller than a dimension W2 of the remaining portion of the third portion 93 in the seat front-rear direction. This results in a sectional area of the stepped portion 94 being smaller than a sectional area of the remaining portion of the third portion 93.

In the present embodiment, a part hatched with two-dot chain lines has been removed from the third portion 93 to thereby render the dimension W1 of the stepped portion 94 in the seat front-rear direction smaller than the dimension W2 of the remaining portion of the third portion 93 in the seat front-rear direction.

In other words, in the present embodiment, a recess 94A recessed from a seat front side toward a seat rear side is arranged in the vicinity of the stepped portion 94. The recess 94A renders the dimension W1 of the stepped portion 94 smaller than the dimension W2 of the remaining portion of the third portion 93.

The recliner plate 9 of the present embodiment is formed by applying plastic working, such as press working, to a single steel plate having a uniform thickness dimension. Thus, the first portion 91, the second portion 92, and the third portion 93 including the stepped portion 94 have substantially the same thickness dimension.

Accordingly, a flexural rigidity (i.e., a geometrical moment of inertia) of the third portion 93 excluding the stepped portion 94 and a range from the third portion 93 excluding the stepped portion 94 over to the first portion 91 in the recliner plate 9 is greater than that of the stepped portion 94.

Figure 8:
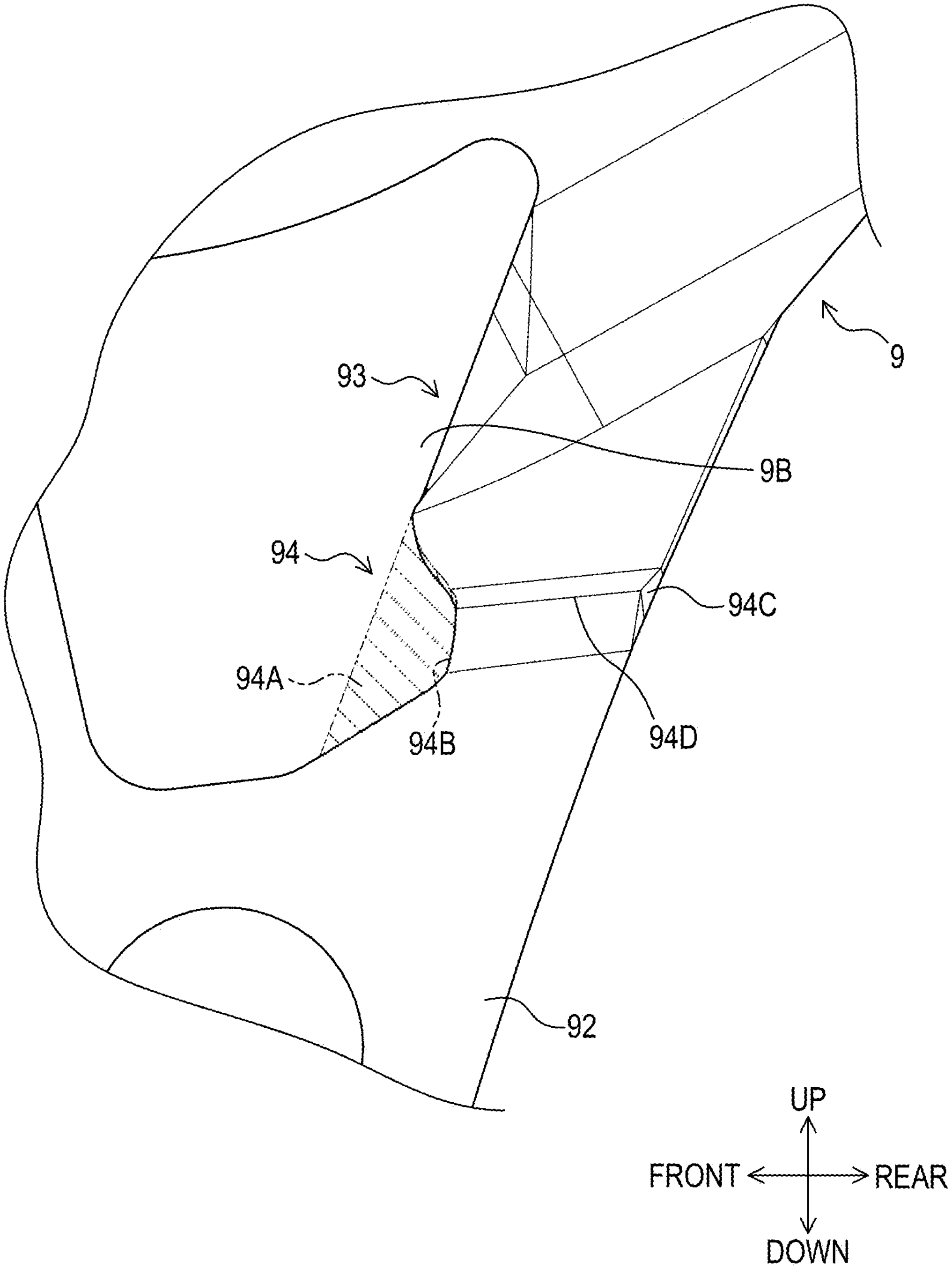
FIG. 8 is a diagram showing the recliner plate of the first embodiment.

As shown in FIG. 8, the recess 94A is formed such that a top 94B of the recess 94A is located on an imaginary line 94D obtained by connecting inflection points 94C of the stepped portion 94. Here, the top 94B of the recess 94A refers to a bottom of a convexed recess recessed toward the seat rear side.

That is, since the third portion 93 includes the portion located on the inside with respect to the second portion 92, locations where a gradient is inverted, that is, the inflection points 94C, are continuously present on the stepped portion 94 of the third portion 93 connecting to the second portion 92.

Since the stepped portion 94 is formed by bending a plate material forming the recliner plate 9, the inflection points 94C form a single line, that is, the imaginary line 94D, and the top 94B of the recess 94A is located on an end, on the seat front side, of the imaginary line 94D.

3. Characteristic Features of Vehicle Seat of Present Embodiment

In the vehicle seat 1 of the present embodiment, the flexural rigidity of the stepped portion 94 is relatively small. Thus, when a large load including a downward component acts on the recliner plate 9, stress is likely to concentrate on the stepped portion 94. This causes the stepped portion 94 to be plastically deformed preferentially.

Therefore, combined with an effect of the impact absorbing hole 9B, that is, an effect in which the specific portion provided in the recliner plate 9 is plastically deformed proactively to thereby cause the specific portion to absorb a load energy, the load to act on the recliner 7 in the event of a collision can be reliably reduced.

The recess 94A recessed from the seat front side toward the seat rear side is arranged in the portion of the third portion 93 connecting to the second portion 92, and the recess 94A renders the dimension W1 of the stepped portion 94 in the seat front-rear direction smaller than the dimension W2 of the remaining portion of the third portion 93 in the seat front-rear direction. This makes it possible to inhibit the back frame 5A from falling rearward significantly when a load is applied.

Specifically, if the recess is recessed from a rear end side of the recliner plate 9 toward the seat front side, that is, if the recess is formed as a recess convexed in a direction opposite to that of the recess 94A of the present embodiment, when a load acting on the back frame 5A deforms the stepped portion 94 such that a space in the recess is reduced, the back frame 5A falls rearward significantly.

In contrast, the recess 94A of the vehicle seat 1 is recessed from the seat front side toward the seat rear side; thus, even when a load acting on the back frame 5A deforms the stepped portion 94 such that the space in the recess 94A is reduced, deformation to cause the back frame 5A to fall rearward significantly can be inhibited.

Deformation Analysis of Recliner Plate and so On

Figure 9:
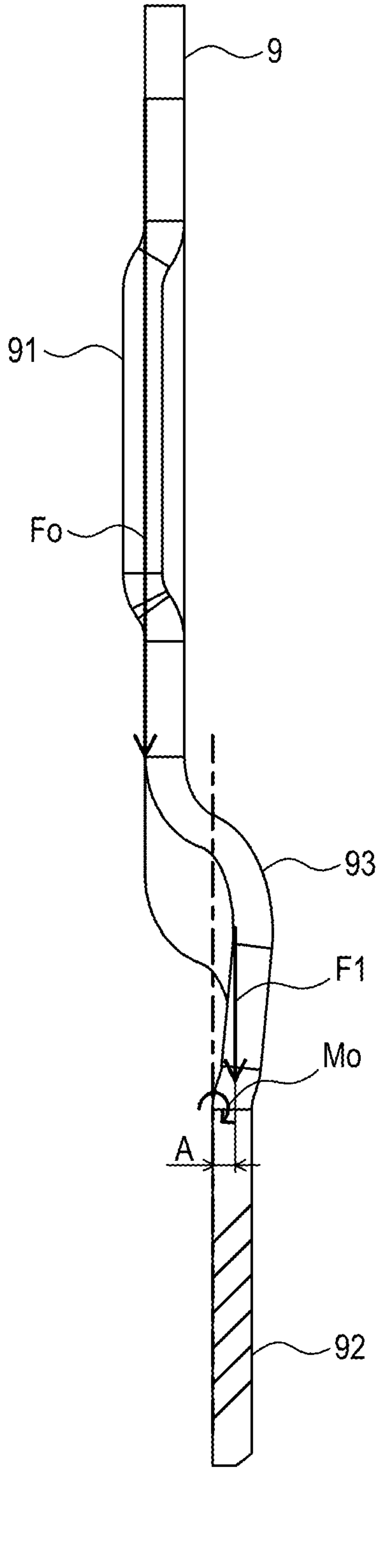
FIG. 9 is a diagram showing a load acting on the recliner plate.
Figure 10:
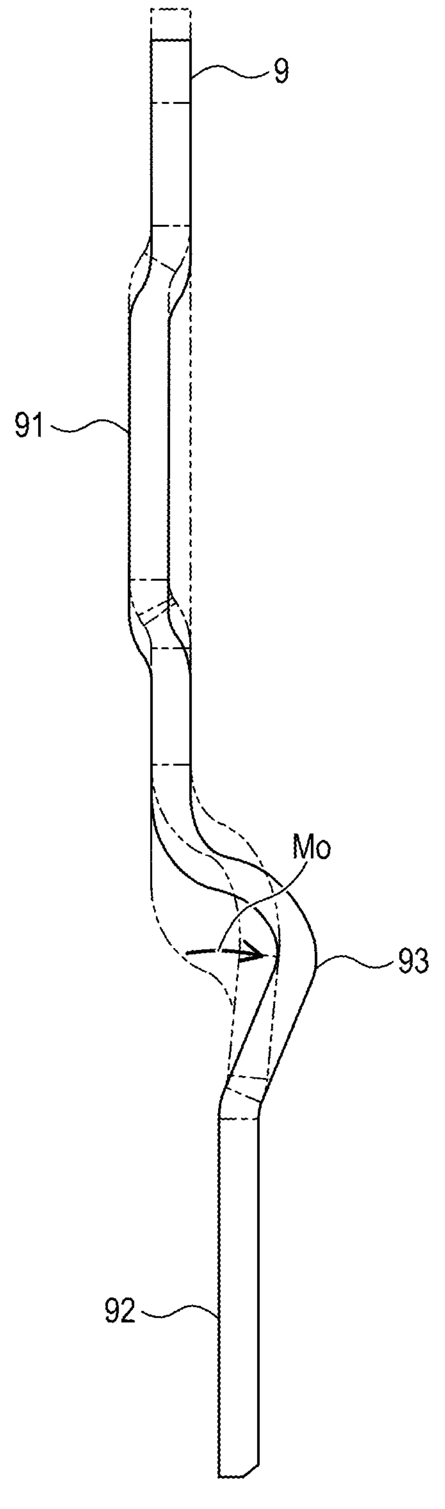
FIG. 10 is a diagram showing a deformation behavior of the recliner plate.
Figure 11:
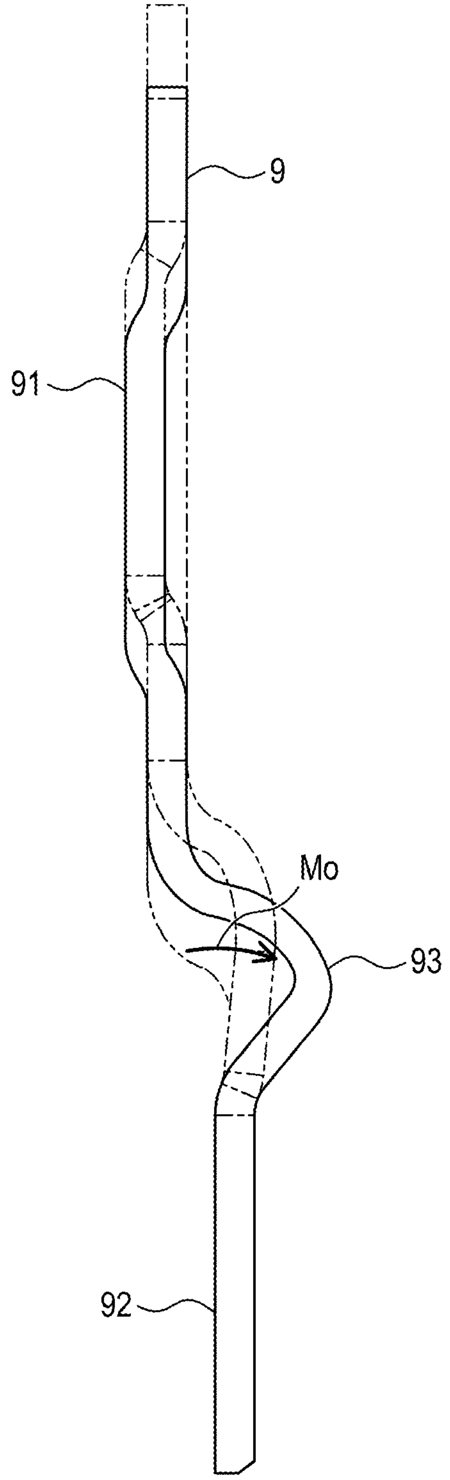
FIG. 11 is a diagram showing the deformation behavior of the recliner plate.

FIGS. 10 and 11 show deformation of the recliner plate 9 when a large downward load acts on the recliner plate 9 via the seatback 5 and the recliner 7 (see FIG. 9).

Specifically, when a load Fo is input to the first portion 91 in the recliner plate 9, the load Fo is transmitted through the third portion 93 to the stepped portion 94. As a result, a force F1 is generated in the stepped portion 94.

Since the third portion 93 includes the portion located on the inside with respect to the second portion 92 (see a difference A in FIG. 9), a moment Mo centered on the stepped portion 94 is generated at this time. The moment Mo is a moment acting in a direction to tilt the third portion 93 toward the inside.

Then, when the moment Mo starts to deform the third portion 93 toward the inside (see the solid arrow in FIG. 10), the moment Mo increases according to the progress of the deformation of the third portion 93, and such deformation progresses further so that the third portion 93 buckles (see the solid arrow in FIG. 11). Thereafter, the deformation of the third portion 93 further progresses to put the third portion 93 and so on into an almost completely fractured state.

On the other hand, the first portion 91 and the second portion 92 are less deformed than the third portion 93, and the recliner plate 9 and the recliner 7 are maintained in a joined state. That is, in the vehicle seat 1 of the present embodiment, even when the recliner plate 9 is in the state of fracture, occurrence of fracture deformation so as to detach the recliner plate 9 from the recliner 7 is inhibited.

In other words, in the vehicle seat 1 of the present embodiment, when a large load is input, a state is inhibited in which the stepped portion 94 in the recliner plate 9 is significantly displaced toward the inside and in which the first portion 91 is displaced toward the outside (see FIG. 4). This results in inhibiting occurrence of the fracture deformation so as to detach the recliner plate 9 from the recliner 7.

OTHER EMBODIMENTS

The recess 94A of the above-described embodiment is recessed from the seat front side toward the seat rear side. However, the present disclosure is not limited thereto. Specifically, in the present disclosure, the recess 94A may be recessed from the rear end side of the recliner plate 9 toward the seat front side, for example.

In the above-described embodiment, the first portion 91, the second portion 92, and the third portion 93 including the stepped portion 94 have substantially the same thickness dimension. However, the present disclosure is not limited thereto. Specifically, in the present disclosure, a configuration may be employed in which the thickness dimension of the stepped portion 94 is smaller than the other portions, for example.

In the above-described embodiment, the configuration is employed in which the top 94B of the recess 94A is located on the end, on the seat front side, of the imaginary line 94D, which line is obtained by connecting the inflection points 94C. However, the present disclosure is not limited thereto. Specifically, in the present disclosure, the recess 94A may be a recess having a simple rectangle-like shape, for example.

In the above-described embodiment, the lower arm 3B, the recliner 7, and the side frame 5B are arranged on the inside with respect to the recliner plate 9 in the seat-width direction. However, the present disclosure is not limited thereto. Specifically, in the present disclosure, the lower arm 3B may be arranged on the outside with respect to the recliner plate 9 in the seat-width direction, for example.

In the above-described embodiments, the vehicle seat according to the present disclosure is applied to the automobile. However, application of the disclosure disclosed herein is not limited thereto. Specifically, the present disclosure is also applicable to, for example, a seat used in vehicles, such as railroad vehicles, ships, or aircraft, and to a stationary seat used in theaters, at home, or in other places.

Moreover, it is sufficient that the present disclosure be consistent with the gist of the disclosure described in the above-described embodiments, and the present disclosure is not limited to the above-described embodiments. Therefore, a configuration may be employed in which at least two embodiments among the above-described embodiments are combined together or in which any of the elements shown in the drawings or of the elements described with reference numerals is removed in the above-described embodiments.

What is claimed is:

1. A vehicle seat to be mounted in a vehicle, the vehicle seat comprising:

a back frame forming a framework of a seatback;

a cushion frame forming a framework of a seat cushion;

a recliner configured to change an angle of the back frame relative to the cushion frame, the recliner being fixed, at one side thereof in a seat-width direction, to the back frame; and a recliner plate to which the recliner is fixed at another side thereof in the seat-width direction, the recliner plate being fixed to a rear end portion of the cushion frame, the recliner plate containing an impact absorbing hole arranged below a rotation center shaft of the recliner, the recliner plate including:

a first portion fixed to the recliner;

a second portion fixed to the cushion frame; and a third portion located between the first portion and the second portion and located rearward of the impact absorbing hole, the third portion including a stepped portion connecting to the second portion, the third portion including a portion located on an inside with respect to the second portion, the inside being a side, in the seat-width direction, on which the recliner is located with respect to the recliner plate, the recliner and the back frame being arranged on the inside with respect to the recliner plate in the seat-width direction, a dimension of the third portion in the vicinity of the stepped portion in a seat front-rear direction being smaller than a dimension of a remaining portion of the third portion in the seat front-rear direction, to thereby render a sectional area of the stepped portion smaller than a sectional area of the remaining portion of the third portion, and a flexural rigidity of the third portion excluding the stepped portion and a range from the third portion excluding the stepped portion over to the first portion in the recliner plate being greater than a flexural rigidity of the stepped portion.

2. The vehicle seat according to claim 1, wherein a recess recessed from a seat front side toward a seat rear side is arranged in a portion of the third portion connecting to the second portion, and wherein the recess renders the dimension of the stepped portion in the seat front-rear direction smaller than the dimension of the remaining portion of the third portion in the seat front-rear direction.

3. The vehicle seat according to claim 2, wherein the recess is formed such that a top of the recess is located on an imaginary line obtained by connecting inflection points of the stepped portion.

4. The vehicle seat according to claim 2, wherein the cushion frame is arranged on the inside with respect to the recliner plate in the seat-width direction.

5. The vehicle seat according to claim 2, wherein the cushion frame is arranged on the inside with respect to the recliner plate in the seat-width direction.

6. The vehicle seat according to claim 3, wherein the cushion frame is arranged on the inside with respect to the recliner plate in the seat-width direction.

* * * * *